United States Patent
McLain et al.

[15] 3,659,983
[45] May 2, 1972

[54] SPINNERETTE FOR THE PRODUCTION OF HOLLOW FIBERS

[72] Inventors: Earl A. McLain; Henry I. Mahon, both of Walnut Creek, Calif.

[73] Assignee: The Dow Chemical Company, Midland, Mich.

[22] Filed: Feb. 19, 1969

[21] Appl. No.: 800,504

[52] U.S. Cl. ............................ 425/72, 264/177 F, 425/380
[51] Int. Cl. ........................................................ D01d 3/00
[58] Field of Search ........................... 18/8 SC, 855, 14 RG; 264/177 F; 161/178

[56] References Cited

UNITED STATES PATENTS 3,081,490  3/1963  Heynen .................... 18/8 SC
3,069,724  12/1962  Schiedrum .................. 18/14 G

FOREIGN PATENTS OR APPLICATIONS 865,843  4/1961  Great Britain ................ 18/8 SC Primary Examiner—J. Spencer Overholser
Assistant Examiner—Ben D. Tobor
Attorney—Griswold and Burdick, H. L. Aamoth and Albin R. Lindstrom

[57] ABSTRACT

A spinnerette for producing hollow fibers and particularly for producing fine bore, uniform permeable hollow fibers useful as the separation membrane in reverse osmosis, ultrafiltration, etc. is disclosed. The spinnerette combines a unique molten polymer passageway and gas passageway to supply an inert gas to the center of the hollow fiber as it is extruded from the orifice.

5 Claims, 8 Drawing Figures

INVENTORS.
Earl A. McLain
Henry I. Mahon
BY H. L. Aamoth
AGENT

INVENTORS.
Earl A. McLain
Henry I. Mahon

BY H. L. Aamoth

AGENT

SPINNERETTE FOR THE PRODUCTION OF HOLLOW FIBERS

BACKGROUND OF THE INVENTION

Hollow fibers are not new and hollow fiber spinnerettes have been available to the textile industry for a number of years. The interest of the textile industry concerned such features as lower apparent density, lower rate of heat transfer, reduced pilling in staple fiber fabrics and special optical effects depending on the shape of the fiber cross section. Generally, these features were not dependent on a uniformly dimensioned hollow fiber.

However, the use of permeable hollow fibers as the separatory membrane in such processes as reverse osmosis, ultrafiltration and the like requires high uniformity in the hollow fibers for the most efficient operation. Additionally, fine bore fibers are desired in order to incorporate the largest possible separatory membrane surface area per unit of volume.

The processes and spinnerettes previously proposed have not been satisfactory for the preparation of permeable hollow fibers. Processes in which air or gaseous producing materials are combined with the fiber forming material are difficult to control and obtain a uniform diameter and fiber wall thickness. Spinnerettes capable of supplying a gas to the center of each filament as it is extruded are usually very complicated devices which are expensive to produce and maintain in operating condition. Such spinnerettes may be formed from two metal parts which are combined together in some manner, e.g. U.S. Pat. No. 3,075,242 or Great Britain Pat. No. 1,061,692; and it is difficult to maintain the parts in alignment. Also, for structural reasons, multipart spinnerettes require relatively thick parts which results in poorer heat transfer to the spinnerette face.

It has also been proposed to spin a fiber forming material through segmented orifices and have the extruded sections coalesce to form a hollow fiber, especially if the polymer tends to swell after extrusion from the orifice. However, the problems in continuously producing a leak-free, uniform hollow fiber by such a process are obvious.

SUMMARY OF THE INVENTION

This invention relates to a novel spinnerette which combines in a single piece a unique combination of a molten polymer passageway and a gas passageway through which gas is supplied to the fiber center as the hollow fiber is melt spun. The one-piece construction is simple enough to be readily constructed to very small dimensions so that uniform, fine bore hollow fibers may be prepared in a continuous manner. While hollow fibers having non-circular cross sections may be prepared the spinnerette of this invention is particularly valuable in making hollow fibers of uniform circular cross section.

The spinnerette body defines a molten polymer feed chamber having a divider member extending inwardly at least part way across the chamber from a side wall and integral with the bottom of said chamber. An orifice defined by the intersection of an endless passageway with an outlet surface, is located generally under a portion of the divider and a portion of the endless passageway communicates with the feed chamber. The orifice generally is an annular opening in the outlet surface but may be elliptical, octagonal, etc. The molten polymer flows into the feed chamber, then into the endless passageway and is extruded from the orifice which is defined by the intersection of the endless passageway with the outlet surface.

The gas passageway for supplying gas to the center of the hollow fiber as it is extruded from the orifice comprises a gas inlet passageway extending into the divider member and a gas outlet passageway which communicates with the gas inlet and which terminates at the outlet surface area enclosed within said orifice. The gas outlet passageway is enlarged adjacent to the outlet surface termination point such as by a counterbore.

Figure 1:
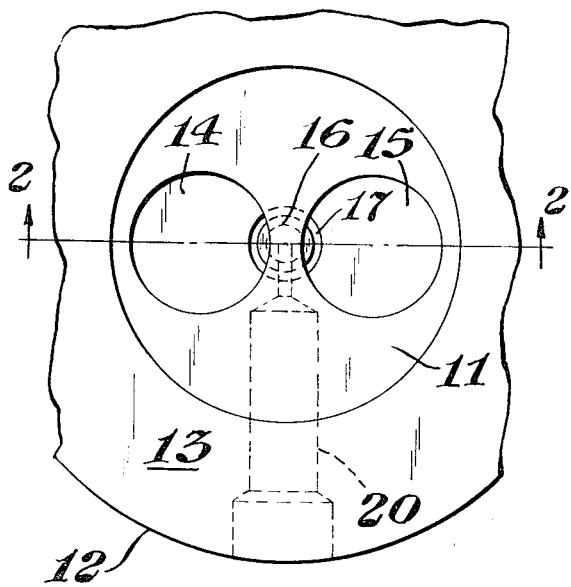
FIG. 1 is a top view of a spinnerette according to this invention showing the communication between the feed chamber and the endless (annular) passageway.

Embodiments of this invention, in addition to those disclosed in the drawings, will be apparent from the following detailed description.

DETAILED DESCRIPTION OF THE INVENTION

The spinnerette of this invention comprises a body member having an inlet and an outlet surface. The body member defines a feed chamber extending part way therein from the inlet surface having side walls and a bottom. The feed chamber has a divider member extending inwardly at least part way across the chamber from a side wall and integral with the bottom of said chamber.

The body member further defines an endless passageway, preferably an annular passageway, extending part way therein from the outlet surface and generally disposed under the divider member. A portion of this passageway communicates with the feed chamber. The intersection of the passageway with the outlet surface defines an orifice. Usually, the orifice is an annular opening in the outlet surface but it may take a variety of non circular forms.

To provide the gas to the center of the hollow fiber as it is extruded from the orifice the spinnerette body defines a gas inlet passageway which extends into the divider member and communicates with an outlet passageway which has its terminus at the outlet surface enclosed within the orifice. The outlet passageway adjacent the terminus is enlarged, preferably as large as structural considerations will allow. This is an important feature of the invention since it assists in preventing the molten polymer from bridging across the orifice.

In accordance with one illustrative embodiment of this invention the spinnerette shown by various views in FIGS. 1, 2 and 3 may be constructed in the following manner. All like parts are identified by the same reference numerals.

A hole 11 is drilled part way into the spinnerette body 12 from the inlet surface 13. Two additional holes 14 and 15 are drilled from the bottom of hole 11 further into the body on generally parallel axes forming a divider member 16. An annular passageway 17 extends into the body from the outlet surface 18 and is generally disposed under a portion of the divider member 16. The intersection of the passageway with the outlet surface defines an annular orifice 19. A portion of the annular passageway communicates with the holes 14 and 15. With reference to FIGS. 1-3, the molten polymer flows from the hole 11 into holes 14 and 15 and thence into the annular passageway 17 from which it is extruded as a hollow fiber from the orifice 19.

The gas supplied to the center of the hollow fiber flows through an inlet passageway 20 which extends into the divider member and connects with an outlet passageway 21 having a terminus 22 at the outlet surface enclosed within the orifice 19. The passageway is enlarged such as by a counterbore 23 adjacent said terminus. The amount and pressure of the gas discharged from the terminus 22 permits control of the wall thickness of the hollow fiber formed.

It is advantageous to make the counterbore 23 as large in diameter as structural considerations will allow in order to minimize or prevent molten polymer from bridging across the orifice. The gas outlet passageway 21 is not required to be centered with the orifice but may be off-centered. An off-centered passageway may be of advantage in constructing the spinnerette of FIGS. 1–3 since the divider member is thinnest at the exact center and being off-centered makes it easier to drill or form the passageway without breaking into either hole 14 or 15.

A single piece spinnerette constructed according to this disclosure has the advantage of being prepared by electric discharge machining which allows for high precision at small dimensions. In addition the ducts and passageways are short and accessible for cleaning either by solvents or by burning.

This invention is particularly useful for preparing fine bore permeable hollow fibers by melt spinning. For this purpose the preferred outer diameter (O.D.) of the orifice may range from 0.024 to 0.100 inches, the inner diameter (I.D.) from 0.021 to 0.080 inches, and the diameter of the counterbore from 0.018 to 0.056 inches.

It is to be understood that while the description herein is to a single orifice spinnerette, multiple orifice spinnerettes are contemplated by this invention and in actual use would be the preferred means of preparing hollow fibers. The use of spinnerettes and the auxiliary equipment necessary for their operation are well known and no detailed description is needed herein. Briefly, the spinnerette is connected by suitable means (not shown herein) to receive and control the flow of molten polymer which flows through the polymer passageway and is ultimately extruded. Likewise a supply of inert gas is connected to the gas inlet and regulatory means (not shown herein) control the amount and pressure of the gas supplied to the center of the hollow fiber. Additional means may be utilized if needed to maintain the spinnerette at some desired temperature, usually an elevated temperature, etc.

The melt spun fiber or fibers are cooled by passing them down through a column of cooling air and the formed fibers are then collected on a take-up drum which may be rotated at such a rate that the fiber is further drawn down to a smaller size than when extruded. By varying the gas pressure, extrusion rate and speed of the take-up drum hollow fibers of varying size in relation to the size of the spinnerette orifice may be readily prepared.

The spinnerette of this invention is particularly useful for fiber-forming polymeric materials which are normally melt spun without the addition of a solvent. The use of plasticizers allows the melt extrusion of certain polymeric materials such as cellulose esters (cellulose triacetate and the like) which normally melt too close to or at their decomposition points. The use of plasticizers and other like materials are particularly valuable in the preparation of permeable hollow fibers in that after fiber formation the plasticizer and other materials may be leached away from the fiber by a solvent which is a non-solvent for the fiber forming material. Advantageously, cellulose triacetate containing sulfolane and like materials are readily melt extruded and subsequently leached with water to produce a permeable hollow fiber.

The spinnerettes, of course, are not limited to use with cellulose ester fiber forming materials but may be used with a wide variety of polymeric materials such as polyamides, polyesters, polyurethanes, polyureas and other fiber forming materials capable of being melt spun.

Figure 4:
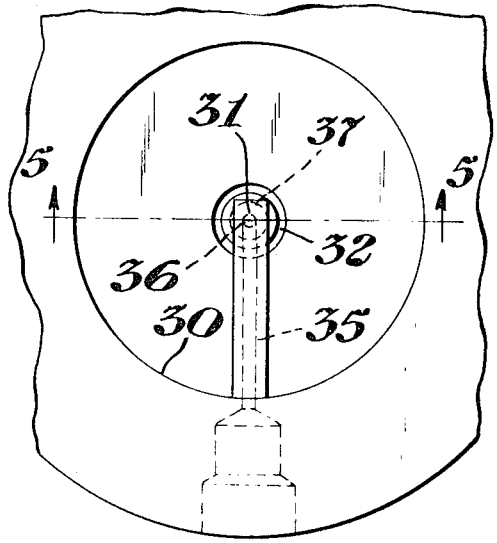
FIG. 4 is a top view of another embodiment of a spinnerette according to this invention.
Figure 5:
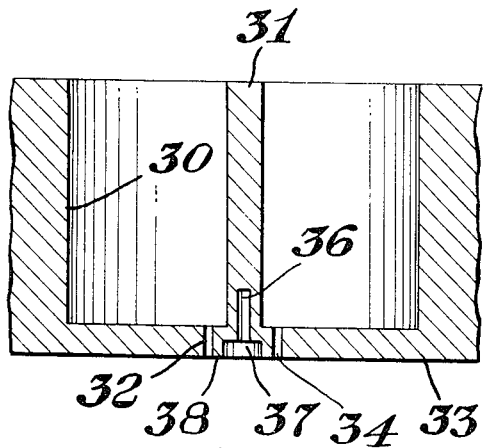
FIG. 5 is a sectional view taken along the line 5—5 of FIG. 4.
Figure 6:
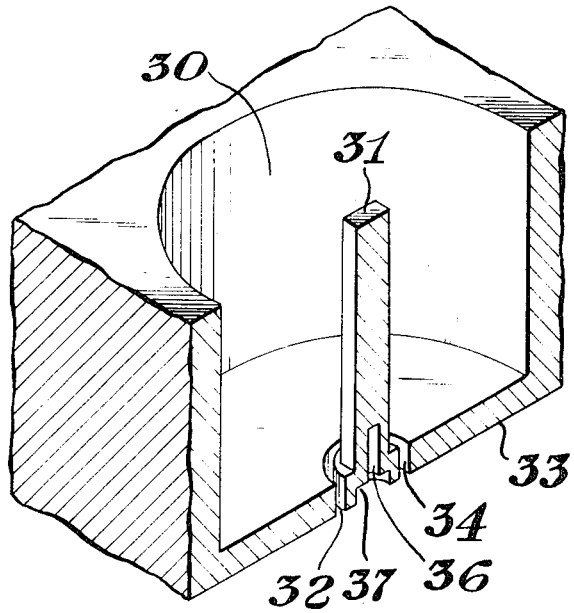
FIG. 6 is a perspective view of the section shown in FIG. 5.

Another embodiment of this invention is shown in FIGS. 4–6 wherein an enlarged feed chamber is shown which improves the flow of molten polymer into the annular passageway. A feed chamber 30 extends into the body of the spinnerette with a divider member 31 extending only part way across the chamber 30. As in the previous spinnerette an endless passageway 32 extends into the body from an outlet surface 33 and communicates with the feed chamber. An orifice 34 (annular in this case) is defined by the intersection of the passageway 32 with the surface 33.

A gas inlet passageway 35 extends into the divider member and communicates with a gas outlet 36 which terminates in the outlet surface enclosed by the orifice 34. A counterbore 37 is formed to enlarge the gas outlet at its terminus. It can be seen, particularly from FIGS. 4 and 6, that the feed chamber is larger with more direct access to the endless passageway than the spinnerette of FIGS. 1–3. Yet, the divider member still provides sufficient support for the center solid portion of the orifice and sufficient mass to provide the necessary gas inlet and outlet passageways.

Figure 7:
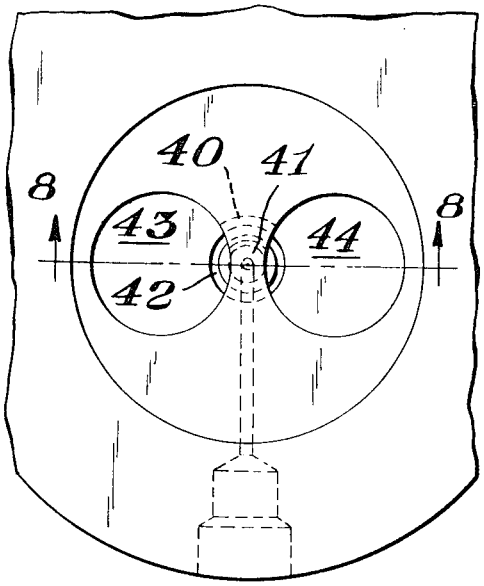
FIG. 7 is a top view of a spinnerette similar to that of FIG. 1 having an enlarged molten polymer passageway under the divider.
Figure 8:
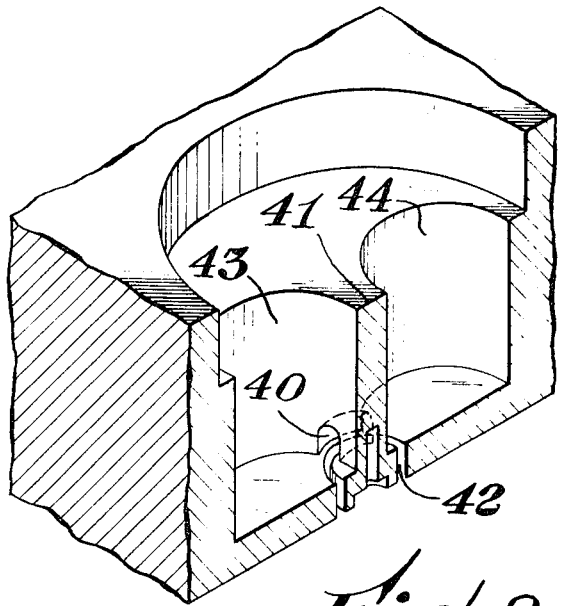
FIG. 8 is a perspective view of a section taken along the line 8—8 in FIG. 7.

An additional embodiment of this invention is shown in FIGS. 7 and 8 wherein the flow of molten polymer into the endless passageway is further improved by forming a conduit (or "tunnel") 40 which traverses the divider member 41 in the area above the endless passageway 42 and wherein the conduit 40 communicates with the feed chambers 43 and 44. More than one such conduit may be present, care being taken that it does not intersect with the gas inlet passageway.

The spinnerettes may be formed from a wide variety of materials, alloys, etc., of which stainless steel is a preferred material. Generally, the choice of material depends on the temperature at which the spinnerette is to be operated, corrosiveness of the molten fiber-forming material and other such factors.

Figure 3:
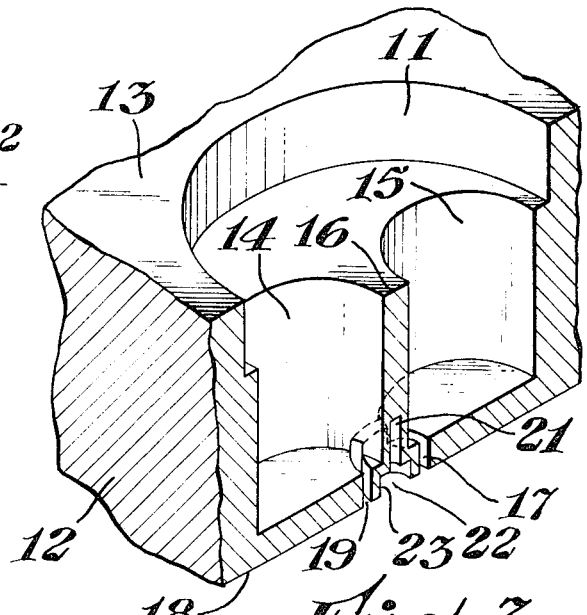
FIG. 3 is a perspective view of the section shown in FIG. 2.
Figure 2:
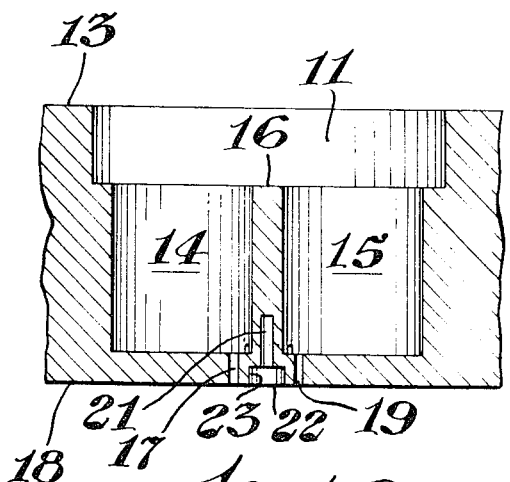
FIG. 2 is a sectional view taken along the line 2—2 of FIG. 1.

To illustrate this invention a single orifice spinnerette was constructed according to the design of FIGS. 1–3 having the following dimensions: hole 11, 0.250 inch in diameter × 0.125 inch; holes 14 and 15, 0.1 inch in diameter by 0.1 inch; annular passageway 17, 0.045 inch O.D. × 0.025 inch with an I.D. of 0.039 inch; gas inlet and outlet passageways 20 and 21 were 0.007 inch in diameter; and the counterbore 23, 0.029 inch in diameter × 0.015 inch.

For melt extrusion a mixture of one part by weight of cellulose acetate powder (Eastman grade 398–3) was blended with 0.3 parts by weight of dimethyl phthalate plasticizer. The blend was vacuum compacted, heated until softened in a metal container held at 200° C., forced through a ⅛-inch diameter × 3-inches long duct in a metal block held at 260° C. and thence as a melt through the above spinnerette constructed from a ¼-inch thick piece of stainless steel ½ inch × 1 inch.

The molten plasticized cellulose acetate was forced through the spinnerette at a rate of 0.6 grams per minute and nitrogen was supplied to the center of the fiber under a pressure equivalent to a 1½ inch head of water. The molten extruded fiber was passed down through a vertical column of cooling air to a take-up drum about 8 feet below the spinnerette. The drum was rotated at such a rate that the hollow fiber was drawn down to an O.D. of 45 microns and an I.D. of 30 microns. Subsequently, the plasticizer may be leached away to form a permeable, hollow fiber.

In a similar manner a spinnerette having 16 orifices was also constructed from stainless steel wherein each orifice and its polymer and gas passageways were constructed according to FIGS. 1–3.

The above description and examples are set forth for purposes of illustration. Many variations and modifications thereof will be obvious to those skilled in the art and can be made without departing from the spirit and scope of the invention herein described.

We claim:

1. In a spinnerette for making hollow fibers comprising a body member having an inlet side and an outlet side, said body member defining a feed chamber extending part way therein from the inlet side, said chamber having sidewalls, a bottom and a divider member extending inwardly at least part way across the chamber from a sidewall and integral with the bottom of said chamber and an orifice extending part way therein from the outlet side and generally disposed under the divider member, said orifice communicating with the feed chamber;

the improvement which consists of a gas inlet passageway extending therein into said divider member, a gas outlet passageway one end of which communicates with said gas inlet passageway and the other end of which terminates at the outlet surface enclosed by said orifice, and said gas outlet passageway having a counterbore adjacent the outlet surface enclosed by said orifice;

wherein said annular orifice has an outside diameter of about 0.024 to 0.100 inches, an inside diameter of about 0.021 to 0.08 inches, and wherein said counterbore has a diameter of about 0.018 to 0.056 inches.

2. The spinnerette of claim 1 wherein said orifice is an annular orifice.

3. The spinnerette of claim 1 wherein said body member further defines a conduit traversing the divider member wherein said conduit communicates with the portion of the endless passageway which is disposed under the divider member and with the feed chamber.

4. In a spinnerette for making hollow fibers comprising a body member having an inlet side and an outlet side, said body member defining a pair of coaxial bores in close spaced relationship extending part way therein from the inlet side and an annular orifice extending part way therein from the outlet side and generally disposed under said bores, said annular orifice communicating with both bores;

the improvement which consists of a gas inlet extending therein into the body member portion between said bores, a gas outlet one end of which communicates with the gas inlet and the other end of which terminates at the outlet surface enclosed by said orifice, and said gas outlet having a counterbore adjacent the outlet surface enclosed by said orifice;

wherein said orifice has an outside diameter of about 0.024 to 0.100 inches, an inside diameter of about 0.021 to 0.08 inches, and wherein said counterbore has a diameter of about 0.018 to 0.056 inches.

5. The spinnerette of claim 4 wherein said body member further defines a conduit traversing the divider member wherein said conduit communicates with the portion of the endless passageway which is disposed under the divider member and with the feed chamber.

* * * * *